United States Patent
Michal et al.

(10) Patent No.: US 8,731,869 B2
(45) Date of Patent: May 20, 2014

(54) ADVANCING LAYER SURFACE GRID GENERATION

(75) Inventors: Todd R. Michal, Wentzville, MO (US); Chung-Jin Woan, Santa Clarita, CA (US)

(73) Assignee: The Boeing Company, Chicago, IL (US)

( * ) Notice: Subject to any disclaimer, the term of this patent is extended or adjusted under 35 U.S.C. 154(b) by 495 days.

(21) Appl. No.: 12/730,902

(22) Filed: Mar. 24, 2010

(65) Prior Publication Data

US 2011/0238384 A1 Sep. 29, 2011

(51) Int. Cl.
*G06F 17/50* (2006.01)

(52) U.S. Cl.
USPC .................................. 703/1; 703/2; 345/427

(58) Field of Classification Search
USPC .......................................... 703/2, 1; 345/427
See application file for complete search history.

(56) References Cited

U.S. PATENT DOCUMENTS

| 5,214,752 A * | 5/1993 | Meshkat et al. ............. 345/423 |
| 2005/0091010 A1 | 4/2005 | Fox |
| 2007/0242067 A1* | 10/2007 | Sharma et al. ............... 345/423 |

FOREIGN PATENT DOCUMENTS

GB  2266214  10/1993

OTHER PUBLICATIONS

Athanasiadis, A.N. et al., "Object-Oriented Three-Dimensional Hybrid Grid Generation", 2003, International Journal for Numerical Methods in Engineering, John Wiley and Sons Ltd.*
Marcum, D.L. "Efficient Generation of High-Quality Unstructured Surface and Volume Grids", 2001, Engineering with Computers, Springer-Verlag London Limited.*
Armstrong, CG et al. "Geometric Processing for Analysis", May 30, 2000.*
Mavriplis, Dimitri J., Unstructured Mesh Related Issues in Computational Fluid Dynamics (CFD)—Based Analysis and Design, Sep. 15-18, 2002, 11th International Meshing Roundtable.*
Weatherill, N.P. et al., "The Development of High Quality Unstructured Grids on Parallel Computers", 1995, Fourteenth International Conference on Numerical Methods in Fluid Dynamics, Lecture Notes in Physics vol. 453.*
Merhof, "Anisotropic quadrilateral mesh generation: An indirect approach", Advances in Engineering Software, Elsevier Science . Oxford, GB, vol. 38 , No. 11-12, Jul. 27, 2007, pp. 860-867.
Athanasiadis, "Object-oriented three-dimensional hybrid grid generation", International Journal for Numerical Methods in Engineering, vol. 58, No. 2, Sep. 14, 2003, pp. 301-318.
David L. Marcum, "Generation of Unstructured Grids for Viscous Flow Applications," AIAA 95-0212, 33rd Aerospace Sciences Meeting and Exhibit, Jan. 9-12, 1995, Reno, NV.
T. Michal, "Unstructured Grid Extrusion for Viscous Flow Simulations," AIAA 2001-0444, 39th Aerospace Sciences Meeting & Exhibit, Jan. 8-11, 2001, Reno, NV.

* cited by examiner

*Primary Examiner* — Kamini S Shah
*Assistant Examiner* — Cedric D Johnson

(57) ABSTRACT

A method of generating a surface grid may include forming a layer curve along the surface, forming a plurality of points along the layer curve, and extending a tangent vector from each one of the most recently formed points. Additional points may be formed on the surface at a step distance from the most recently formed points. The additional points may be interconnected to form an additional layer curve. The additional points may be connected with the most recently formed points to form a layer of quadrilateral faces wherein each one of the faces is a column. The growth of a column may be terminated when an aspect ratio of the face in the column exceeds a predetermined value. The steps of extending tangent vectors, forming the additional points, and forming an additional layer curve may be repeated until each one of the columns is terminated.

25 Claims, 12 Drawing Sheets

ADVANCING LAYER SURFACE GRID GENERATION

FIELD

The present disclosure relates generally to computer simulations and, more particularly, to a surface grid generation methodology for computational fluid dynamics (CFD) analysis.

BACKGROUND

During the development of new products, manufacturers frequently rely on computer simulations to evaluate and refine the product design. For example, aerospace and automotive manufacturers rely on computational fluid dynamics (CFD) analysis to determine the interaction of fluids with the surfaces of an object. Manufacturers may also employ CFD analysis to analyze fluid processes such as cooling, mixing and heat transfer. In addition to CFD analysis, manufacturers may rely on computer simulations to evaluate the structural, acoustic and/or electromagnetic response of an object.

Computer simulations such as CFD analysis require the creation of a mesh or grid of elements on the surfaces of the object to be analyzed. For objects having high curvature in at least one direction, it is desirable that the grid is of relatively high resolution (i.e., a relatively fine mesh of grid elements) in the direction of high curvature in order to improve the degree of accuracy of the CFD solution. For example, the wing of an aircraft is generally straight along the leading edge with generally no curvature in the spanwise direction and therefore may require reduced grid resolution in the spanwise direction. However, in the chordwise direction, the wing has an airfoil shape with a relatively high degree of curvature at the leading edge such that the grid resolution at the leading edge along the chordwise direction is preferably higher than the grid resolution along the spanwise direction. Likewise, it is desirable that the grid has a relatively high degree of resolution in certain regions of interest of the object. For example, in the case of a wing, such regions of interest may comprise localized areas of the wing that may be subjected to shockwaves, vortices, localized flow separation and other phenomena.

The prior art includes several methods of generating a grid on an object. For example, one method automatically creates an isotropic grid across the surfaces of an object. Such method results in a grid having the same degree of resolution in all directions of the surface without regard to differences in curvature and without regard to regions of interest on the surfaces that may be subject to localized phenomena. Unfortunately, because of the unnecessarily high degree of resolution along directions of minimal curvature, CFD analysis using such a grid is computationally inefficient due to the relatively large quantity of elements that make up the total grid.

Another method of grid generation minimizes the quantity of elements along directions of low curvature while providing a relatively large quantity of elements along directions of high curvature. The method relies on manual insertion of rectangular grid elements in areas of high curvature or in regions or interest as a means to increase the grid resolution and improve the solution accuracy. Unfortunately, manual insertion of grid elements is labor intensive and can significantly add to the total amount of time required to generate a CFD solution.

A further approach to grid generation relies on automatic creation of anisotropic triangular grid elements having a relatively high aspect ratio in areas of high curvature or in regions of interest. Although the use of anisotropic triangular grid generation allows for control of the grid resolution in a desired direction, the quality of the grid suffers due to misalignment of the grid elements with the direction of curvature. For example, creation of an anisotropic triangular grid on a wing leading edge may result in elements that are misaligned with the direction of curvature which may reduce the accuracy of the CFD solution.

As can be seen, there exists a need in the art for a method for generating a grid on a surface of an object wherein the grid elements have relatively high resolution along directions of high curvature and relatively low resolution along directions of low curvature. Furthermore, there exists a need in the art for a method for generating a grid of high aspect ratio wherein the grid elements are generally aligned with the direction of curvature. Additionally, there exists a need in the art for a method for generating a grid wherein the grid elements transition from high resolution to low resolution in correspondence with a reduction in the degree of curvature along a direction of the surface such as along a chordwise direction of an airfoil section.

SUMMARY

The above-noted needs associated with grid generation are addressed by the methodology disclosed herein wherein the methodology provides a means for generating an advancing front of substantially rectangular or quadrilateral faces from a boundary of a surface. The boundary may comprise a leading edge of an aerodynamic surface including, but not limited to, a wing, a nacelle, a control surface or any other aerodynamic surface. However, the methodology may be applied to any type of surface and is not limited to aerodynamic surfaces.

In an embodiment, the methodology may provide a means for uniformly transitioning the advancing front of faces from substantially anisotropic or high aspect ratio quadrilateral faces at locations of high curvature to substantially isotropic quadrilateral faces at the terminations of a series of columns which make up the grid. In an embodiment, the grid generation methodology may further transition the grid of isotropic quadrilateral faces to isotropic triangular faces at the termination of the columns.

Advantageously, the grid generation methodology provides a means for generating a grid of relative high resolution in locations of relatively high curvature (i.e., small radius of curvature). The grid generation methodology may minimize the grid resolution along a direction of reducing curvature of the surface. In this manner, the grid generation methodology minimizes the total quantity of elements which make up the grid in order to improve computational efficiency.

In an embodiment, the methodology includes the step of forming an initial layer curve along a boundary such as along a leading edge of a surface at a location of high curvature. A plurality of points may be formed in a distributed manner along the initial layer curve. Tangent vectors may be extended from each one of the points along a direction that is substantially normal to the layer curve and substantially tangent to the surface at the respective point. A set of additional points may be formed on the surface at a step distance from corresponding ones of the most recently formed points such as the points on the initial layer curve. The set of additional points may be formed on the surface in substantial alignment with a projection of the corresponding tangent vector associated with each one of the points.

The methodology may further include interconnecting the set of additional points to form an additional one of the layer curves. The set of additional points may further be connected with corresponding ones of the most recently formed points in order to form a layer of quadrilateral faces. Each one of the quadrilateral faces in a series comprises at least one column which may grow with the layer-by-layer advancement of the quadrilateral faces. Each one of the columns may be terminated upon the occurrence of one of more terminating conditions.

For example, a column may be terminated if the face of the column collides with the face of an adjacent one of the columns creating a crossed face. Likewise, termination of each one of the columns may occur if the face of one of the columns collides with the face of a non-adjacent one of the columns creating overlapping faces. A column may be terminated if the aspect ratio of a face in the column exceeds a predetermined value. In addition, a column may be terminated if the quantity of faces in the column reaches a predetermined quantity.

The layer-by-layer advancement of the grid occurs by iteratively repeating the steps of extending tangent vectors from the recently formed points, forming additional points on the surface at the step distance from the most recently formed points, interconnecting the set of additional points to form an additional layer curve, and connecting the set of additional points with the most recently formed points to form an additional layer of the quadrilateral faces. The process may be iteratively repeated until each one of the columns is terminated upon the occurrence of one or more terminating conditions.

In a further embodiment, the methodology may comprise generating the advancing front of the quadrilateral faces from a boundary of a surface having a leading edge in order to produce a relatively uniform transition from anisotropic quadrilateral faces at an initial layer curve to substantially isotropic quadrilateral faces at the terminations of the columns. The methodology may comprise the steps of forming the layer curve on the leading edge, forming a plurality of points in a distributed manner along the layer curve in a spanwise direction, and extending a tangent vector from each one of the most recently formed points along a direction substantially normal to the layer curve and tangent to the surface.

The methodology may further comprise forming a set of additional points on the surface at a step distance from the corresponding ones of the most recently formed points by advancing each one of the most recently formed points by an amount equal to the step distance along the corresponding tangent vector in order to form an advanced point on the tangent vector. The advanced point may then be projected onto the surface to form the additional point. A temporary vector may be extended between the additional point and the most recently formed point if the distance therebetween is unequal to the step distance. The position of the additional points may be adjusted along the temporary vector such that the additional point may be projected back onto the surface and the distance between the projected point and the most recently created point is again measured and compared to the step distance. The process may be iteratively repeated until the distance between the additional point and the most recently formed points is substantially equivalent to the step distance.

The set of additional points may be interconnected in order to form an additional one of the layer curves. The additional points may be connected with corresponding ones of the most recently formed points in order to form the layer of quadrilateral faces. The quadrilateral faces may comprise the series of columns which may each include at least one quadrilateral face. The growth of each one of the columns may be terminated upon the occurrence of one or more terminating conditions. For example, the column may be terminated if the face of the column collides with the face of an adjacent one of the columns creating a crossed face. The crossed face may occur as a result of crossing tangent vectors of adjacent columns.

A column may be also terminated if the face of the column collides with the face of a non-adjacent one of the columns creating overlapping faces. In addition, a column may be terminated if the face aspect ratio reaches a predetermined quantity such as unity or if the column grows to include a quantity of faces that exceed a predetermined quantity. The above-described steps of forming the additional set of points and forming the additional layer curve may be repeated until each one of the columns is terminated due to occurrence of one or more of the above-described terminating conditions. A front of triangular faces may be advanced from the terminated columns of quadrilateral faces such that the triangular faces advance over a remaining portion of the surface not covered by the quadrilateral faces.

In a further embodiment, the present disclosure includes a computer program product which may comprise at least one computer readable storage medium. The computer readable storage medium may have computer readable program instructions stored therein. The computer readable program instructions may by executed by a processor to enable a processor-based system to generate an advancing front grid of quadrilateral faces on the surface of an object. The computer readable program instructions may comprise the steps of forming the initial layer curve along the surface, forming the plurality of points in a distributed manner along the layer curve, and extending a tangent vector from each one of the most recently formed points along a direction that is substantially normal to the layer curve and which is tangent to the surface at the point.

The methodology implemented by the computer readable instructions may further include the steps of forming a set of additional points on the surface at a step distance from corresponding ones of the most recently formed points and in substantial alignment with the projections of the corresponding tangent vectors onto the surface. The set of additional points may be interconnected to form an additional one of the layer curves. The set of additional points may also be connected with corresponding ones of the most recently formed points to form a layer of the quadrilateral faces. The quadrilateral faces may comprise a series of columns. The growth of a column may be terminated upon the occurrence of one or more terminating conditions including, but not limited to, the face of one of the columns colliding with the face of an adjacent one of the columns creating a crossed face. The terminating conditions may further include the face of a column colliding with the face of a non-adjacent column creating overlapping faces. The terminating condition may also include the face aspect ratio exceeding a predetermined value or the column growing to a predetermined maximum quantity of faces.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
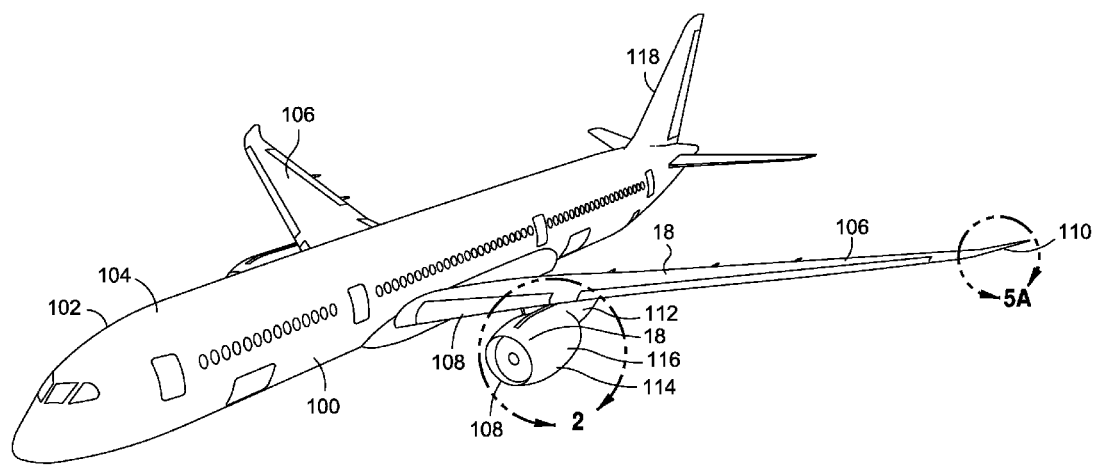
FIG. 1 is a perspective illustration of an aircraft for which a grid may be generated on one or more surfaces.
Figure 2:
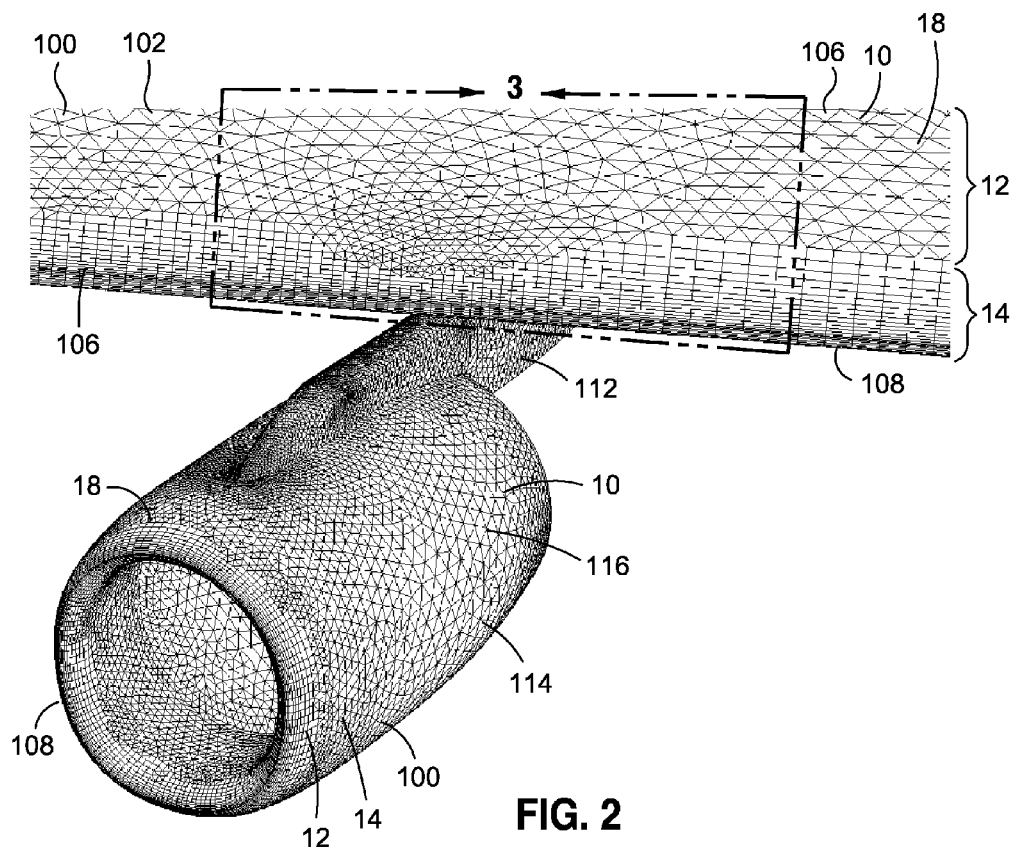
FIG. 2 is an enlarged perspective illustration of a propulsion unit taken from section 2 of FIG. 1 and illustrating the propulsion unit connected to a wing of the aircraft and having a grid formed on the surfaces of the propulsion unit and wing using the methodology disclosed herein.

Referring now to the drawings wherein the showings are for purposes of illustrating preferred and various embodiments of the disclosure only, shown in FIGS. 1 and 2 is a perspective illustration of an aircraft 102 as an example of one of a variety of objects 100 for which a grid 10 (FIG. 2) may be generated to facilitate computer simulations. The grid generation methodology disclosed herein may facilitate the autonomous generation of the grid 10 comprising quadrilateral or rectangular faces 14 (FIG. 2) of a computational mesh. Advantageously, the methodology may facilitate the generation of the grid 10 with sufficiently high resolution along a direction of high curvature in a surface and coarse resolution along a direction of low curvature.

For example, the grid 10 may be generated for the aircraft 102 illustrated in FIG. 1 which may comprise a fuselage 104 having a pair of wings 106 extending outwardly therefrom and including a tail section 118. The wing 106 may include one or more propulsion units 114 which may be connected to the wing 106 by a pylon 112. The wing 106 may be generally straight along the leading edge 108 with generally no curvature in the spanwise direction and requiring reduced grid resolution in the spanwise direction. In contrast, in the chordwise direction, the wing 106 has an airfoil shape with a relatively high degree of curvature at the leading edge 108 requiring higher grid resolution at the leading edge 108 along the chordwise direction and uniformly reducing in resolution as the grid 10 advances aftwardly along the reducing curvature of the airfoil.

Figure 3:
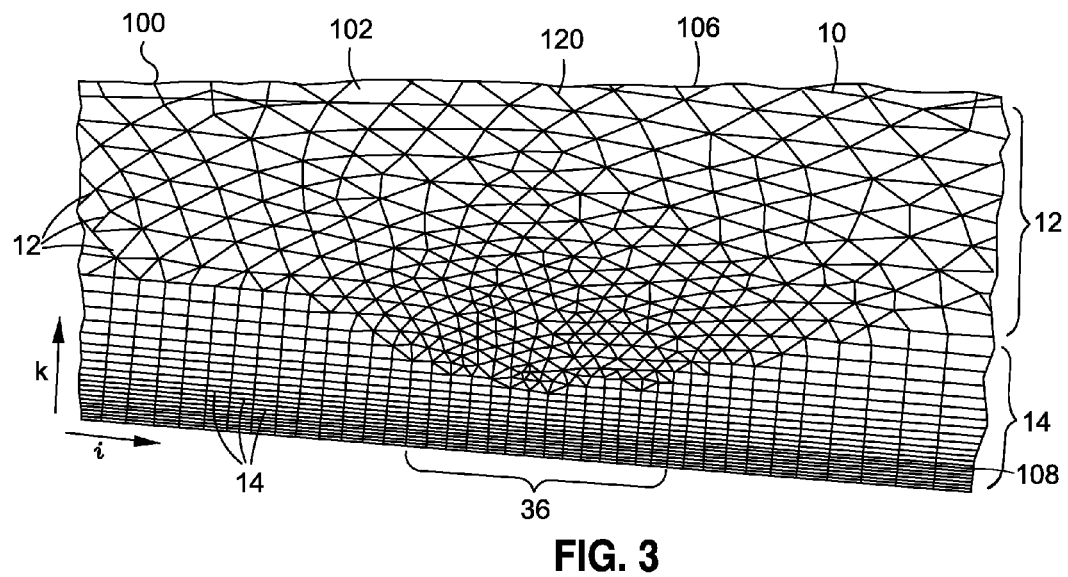
FIG. 3 is an enlarged perspective illustration of a leading edge portion of the wing taken from section 3 of FIG. 2 and illustrating the grid comprising relatively high aspect ratio quadrilateral elements that are generally aligned with the direction of curvature of the wing and further illustrating a relatively uniform transition of the quadrilateral faces to isotropic triangular faces.

FIGS. 2 and 3 illustrate a portion of the wing 106 of the aircraft 102 wherein the portion of the wing 106 has a grid 10 generated by the methodology disclosed herein. As can be seen in FIG. 2, the propulsion unit 114 is connected to the wing 106 by means of the pylon 112 (FIG. 2). The portion of the grid 10 at the wing 106 leading edge 108 and at the nacelle 116 (FIG. 2) leading edge 108 includes quadrilateral faces 14 having a relatively high aspect ratio as a means to improve computational efficiency and solution accuracy.

Referring particularly to FIG. 3, shown is a portion of the leading edge 108 of the wing 106 located immediately aft of the propulsion unit 114 and pylon 112 (FIG. 2). As a result of the disruption of the flow that may be caused by the propulsion unit 114 and pylon 112, a region of interest 36 (FIG. 3) may be defined at the localized area of the wing 106. In the region of interest 36, the wing 106 may be subject to vortices, shock waves and generally turbulent flow as a result of the location of the wing 106 portion downstream of the propulsion unit. In this regard, the resolution of the grid 10 in the area of the wing 106 immediately downstream of the propulsion unit 114 may be increased to improve the accuracy of the solution in the wing 106 portion.

Figure 4A:
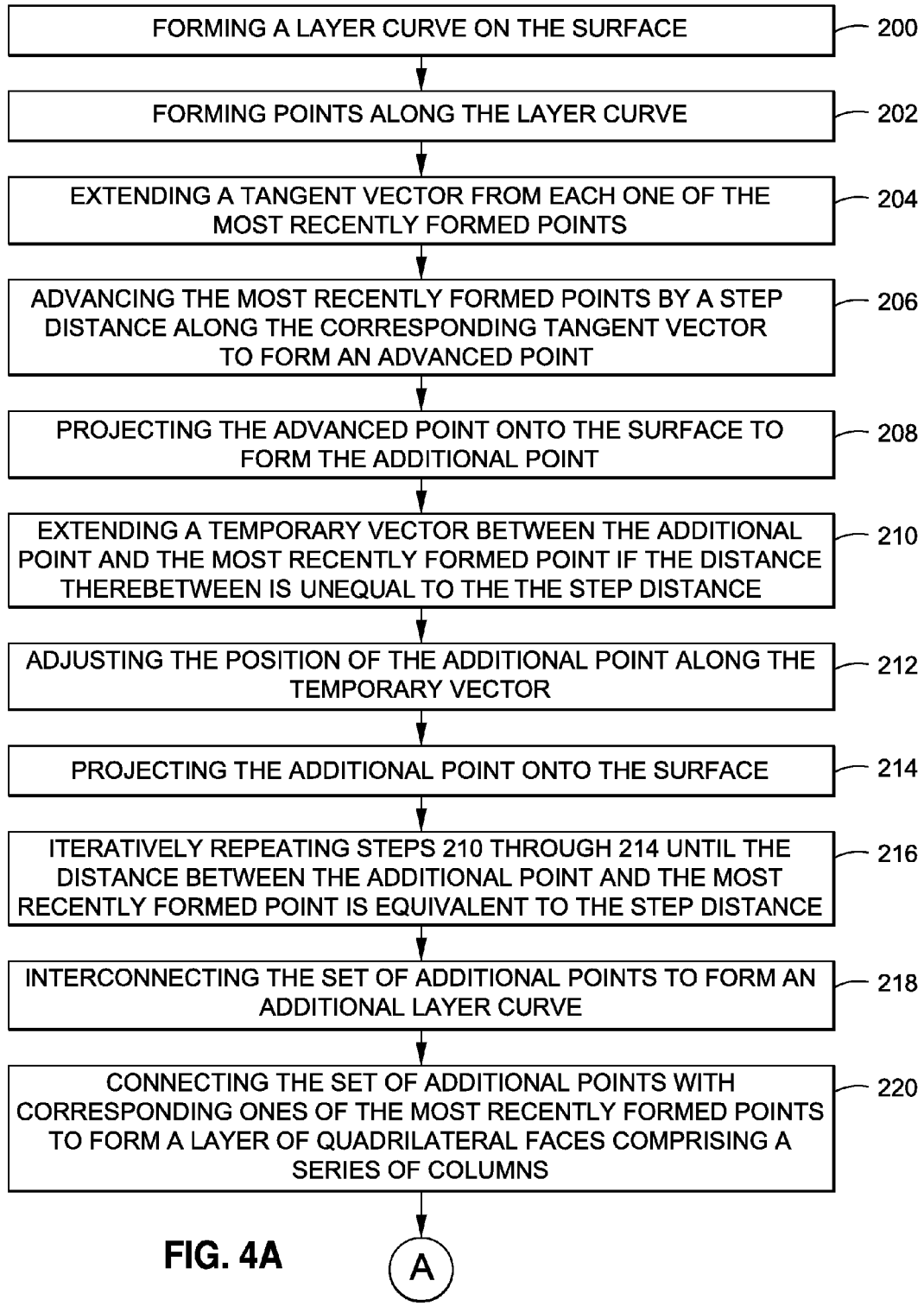
FIGS. 4A-4B collectively illustrate a flow chart of an embodiment of the methodology of generating a grid.
Figure 4B:
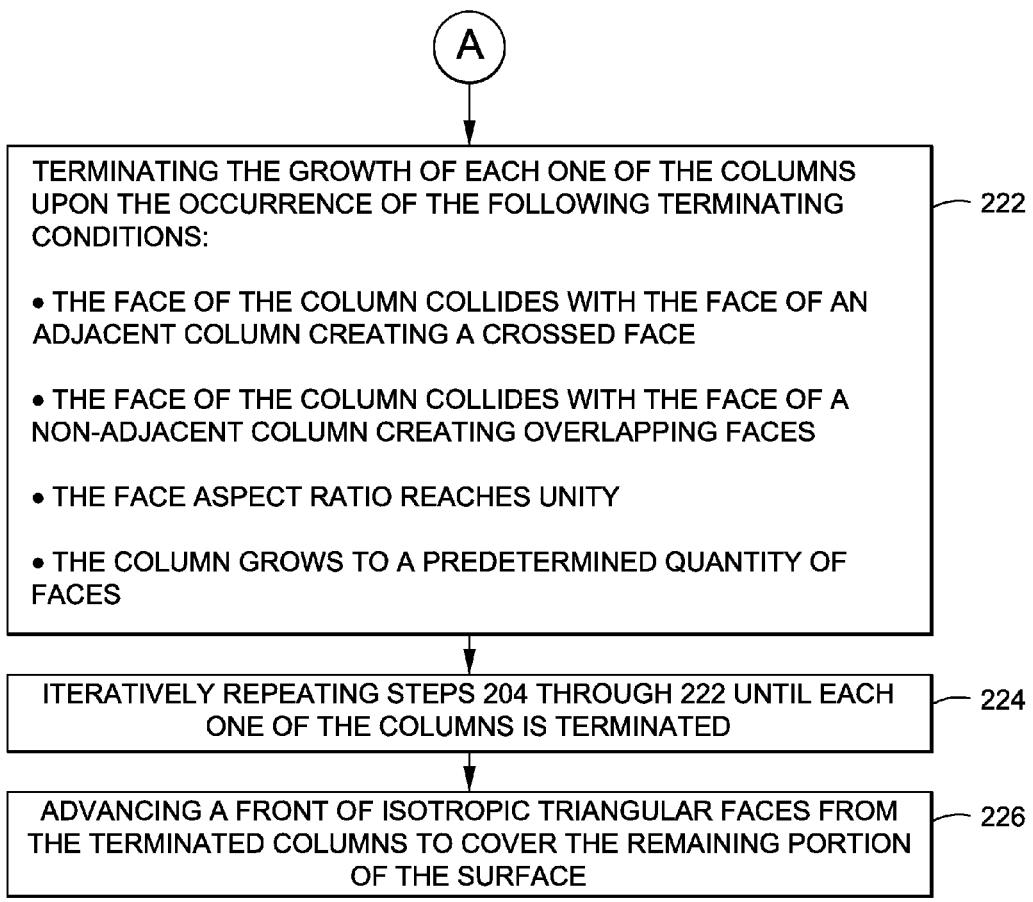
Figure 5A:
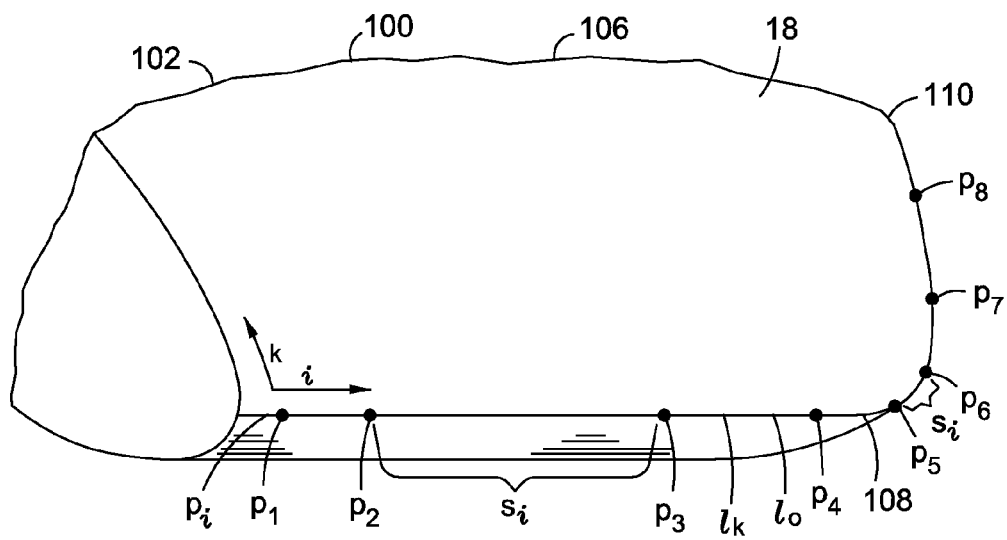
FIG. 5A is a perspective illustration of a wing tip taken from section 5A of FIG. 1 and illustrating a plurality of points distributed along a layer curve formed on a leading edge of the wing.
Figure 5B:
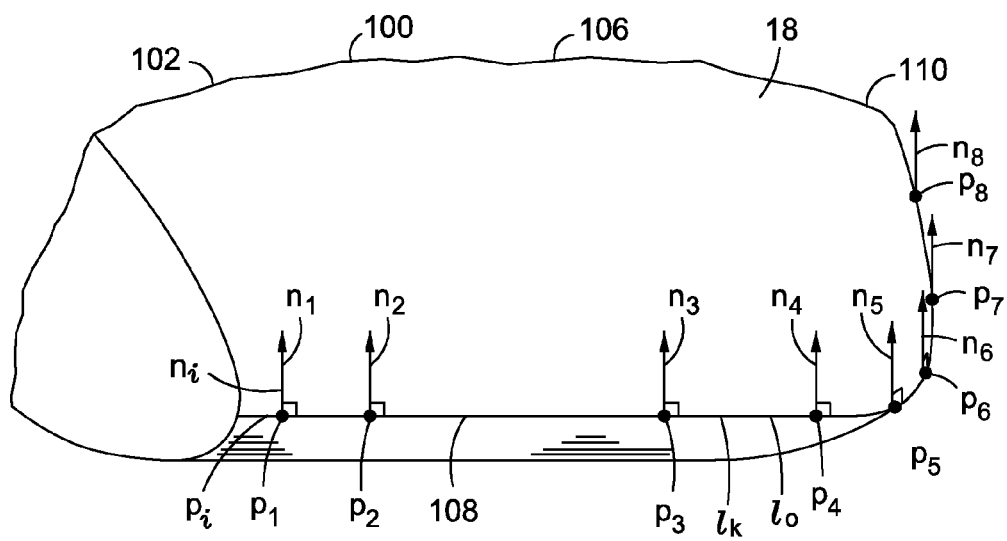
FIG. 5B is a perspective illustration of the wing tip wherein each one of the points has a tangent vector extending therefrom.
Figure 5C:
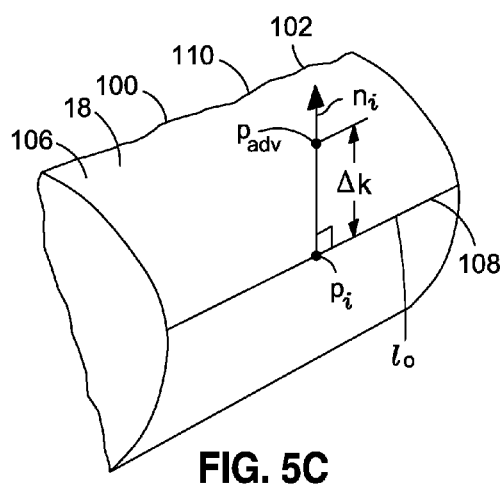
FIG. 5C is an enlarged perspective illustration of a portion of the leading edge of the wing tip of FIG. 5B and illustrating one of the points of the layer curve having a tangent vector extending from the point and being oriented in a substantially normal direction relative to the layer curve and tangent to the surface.
Figure 5D:
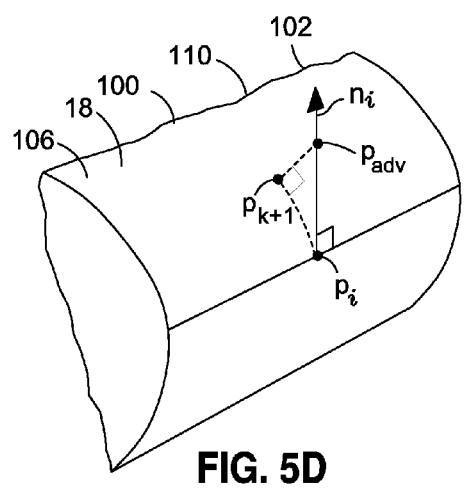
FIG. 5D is a perspective illustration of the leading edge of FIG. 5C and illustrating the point being advanced a predetermined step distance along the tangent vector and projected to the surface to form an additional point on the surface.
Figure 5E:
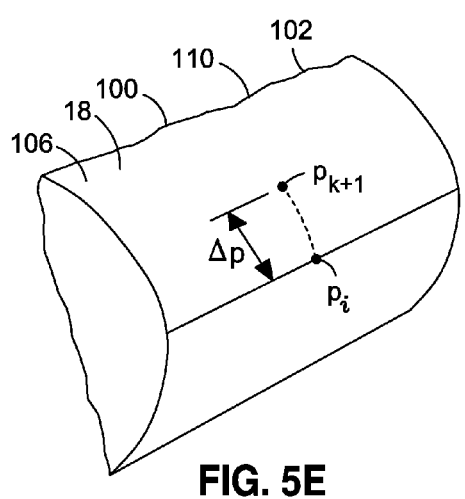
FIG. 5E is a perspective illustration of the leading edge of FIG. 5D and illustrating measurement of a distance between the additional point and the most recently formed point on the layer curve.
Figure 5F:
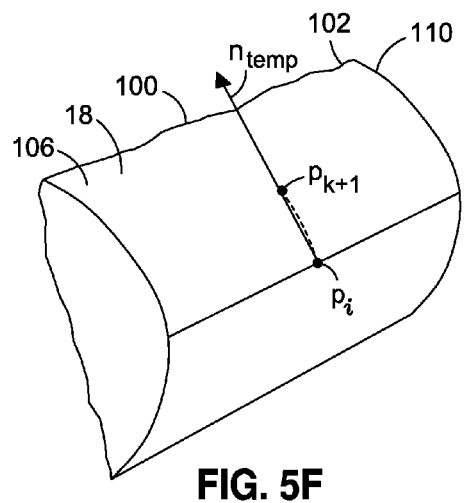
FIG. 5F is a perspective illustration of the leading edge of FIG. 5E and illustrating a temporary vector extended between the additional point and the most recently formed point for adjustment of the location of the additional point along the temporary vector.
Figure 5G:
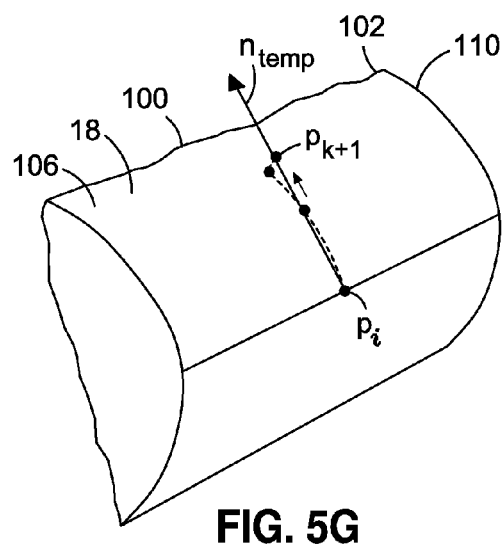
FIG. 5G is a perspective illustration of the leading edge of FIG. 5F and illustrating the adjusted location of the additional point and the projection thereof onto the surface.
Figure 5H:
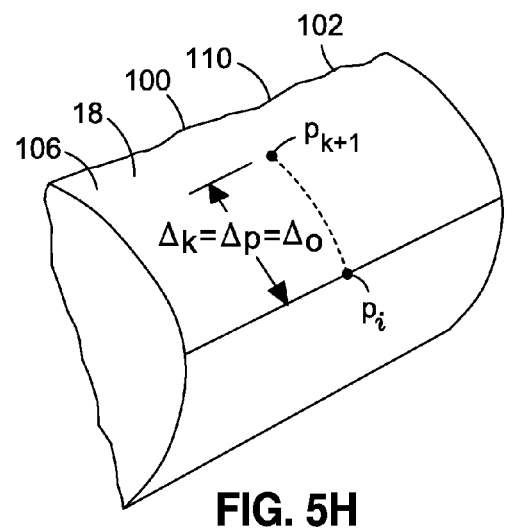
FIG. 5H is a perspective illustration of the leading edge of FIG. 5G and illustrating the additional point on the surface following the iterative repetition of the adjustment of the location thereof along the temporary vector and re-projection onto the surface until the distance between the additional point and the most recently formed point is substantially equal to a step distance.
Figure 5I:
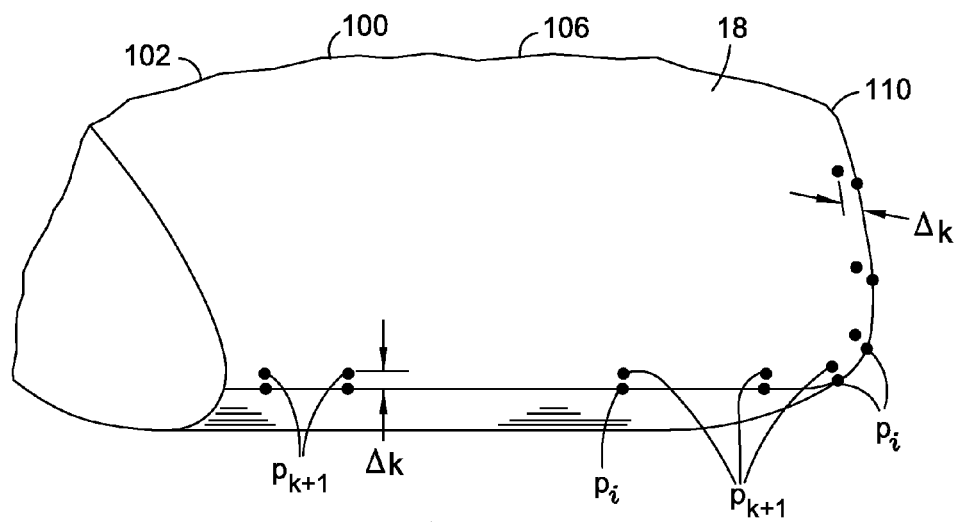
FIG. 5I is a perspective illustration of the wing tip and illustrating a set of additional points formed on the surface at the step distance as a result of the iterative process illustrated in FIGS. 5C-5H.
Figure 5J:
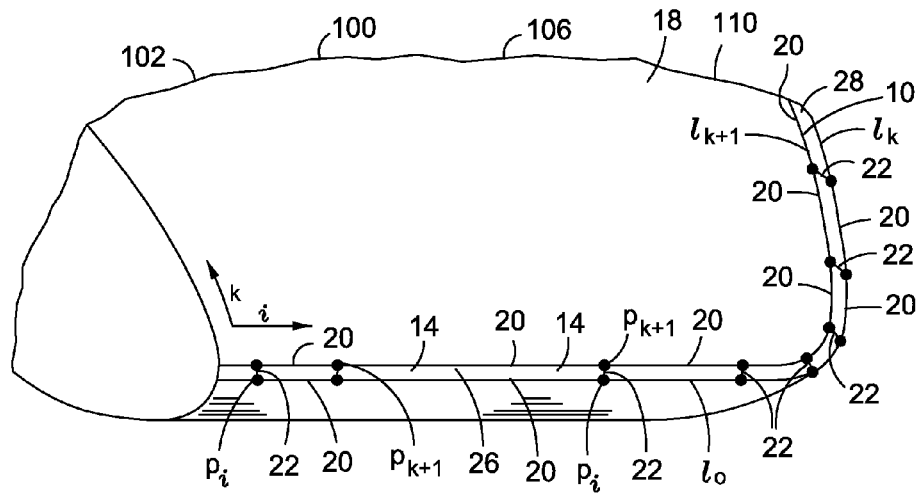
FIG. 5J is a perspective illustration of the wing tip and illustrating the interconnection of the additional points to form an additional layer curve.
Figure 5K:
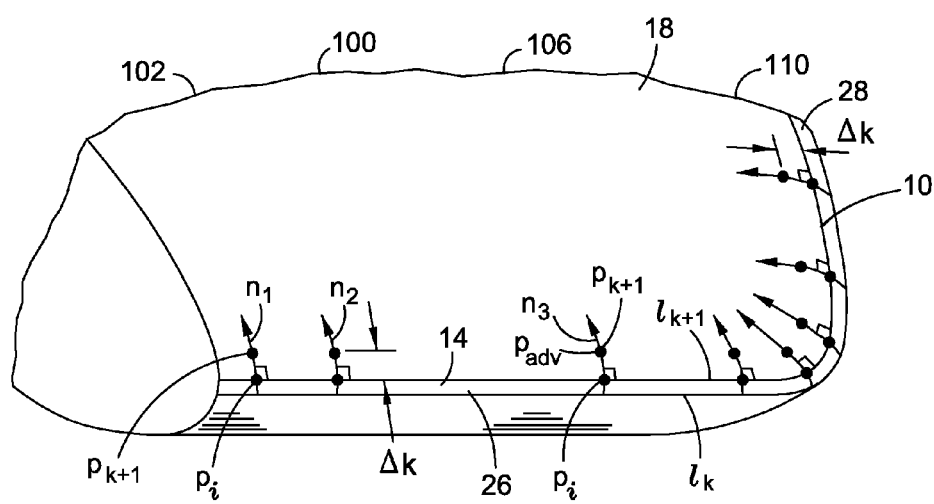
FIG. 5K is a perspective illustration of the wing tip and illustrating the extension of tangent vectors from each one of the additional points.
Figure 5L:
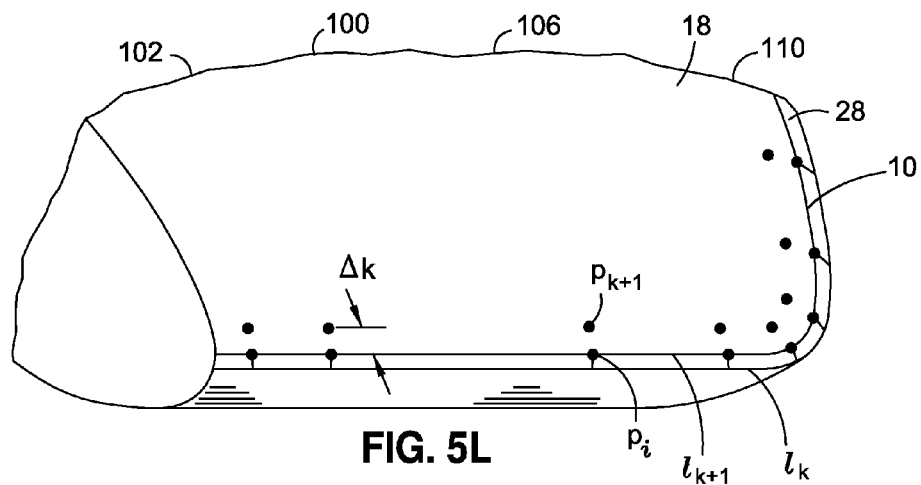
FIG. 5L is a perspective illustration of the wing tip and illustrating the formation of a second set of additional points on the surface at a step distance from the most recently formed points.
Figure 5M:
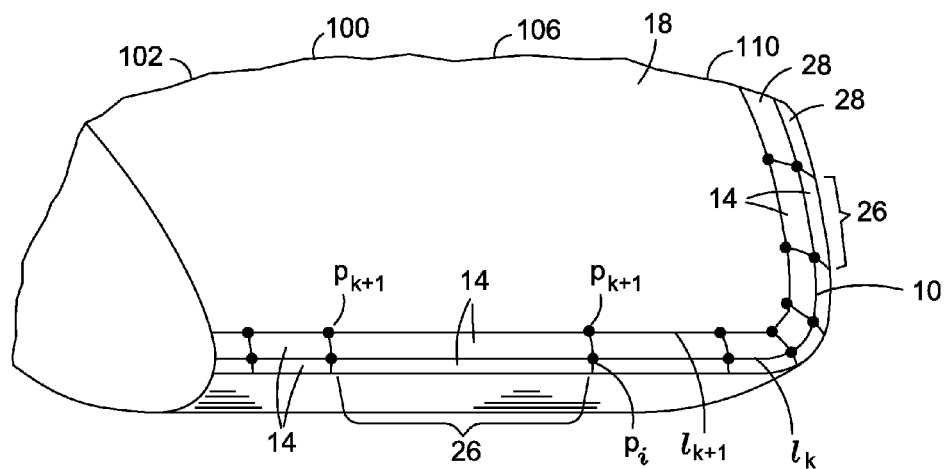
FIG. 5M is a perspective illustration of the wing tip and illustrating the formation of a layer of quadrilateral faces comprising a series of columns between the sets of points.
Figure 5N:
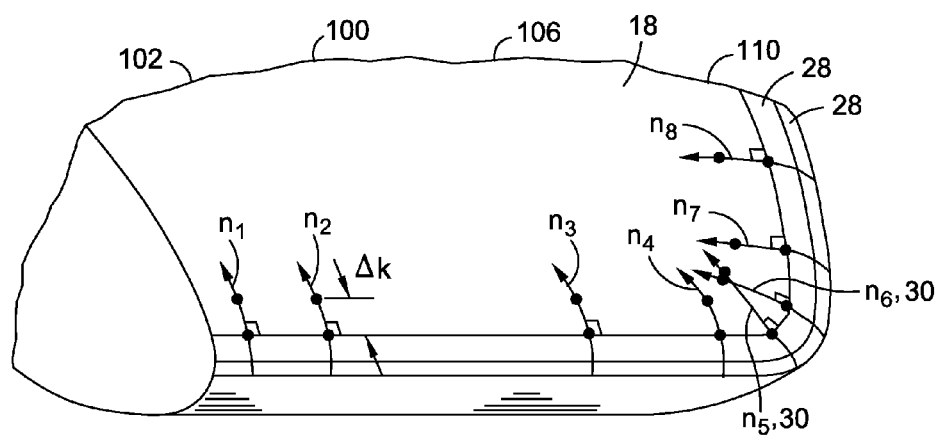
FIG. 5N is a perspective illustration of the wing tip and illustrating crossing tangent vectors of adjacent columns resulting in the collision of the face of one of the columns with the face of an adjacent one of the columns.
Figure 5O:
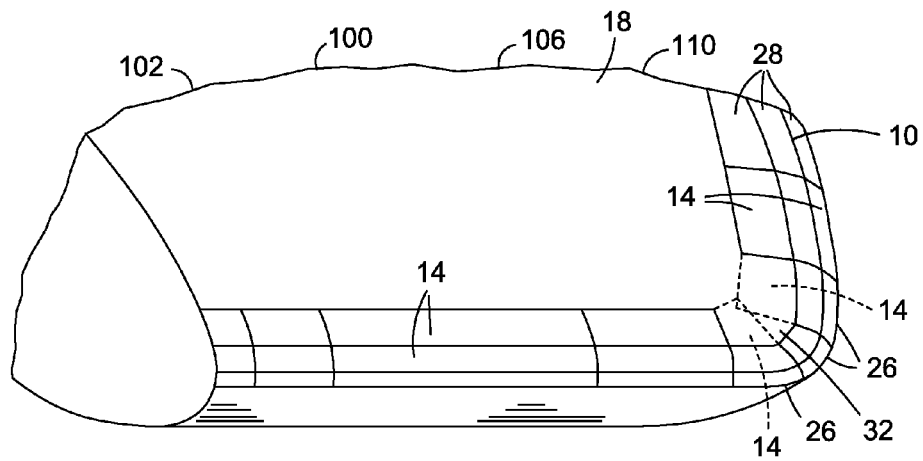
FIG. 5O is a perspective illustration of the wing tip and illustrating a crossed face resulting from the crossed tangent vectors.
Figure 5P:
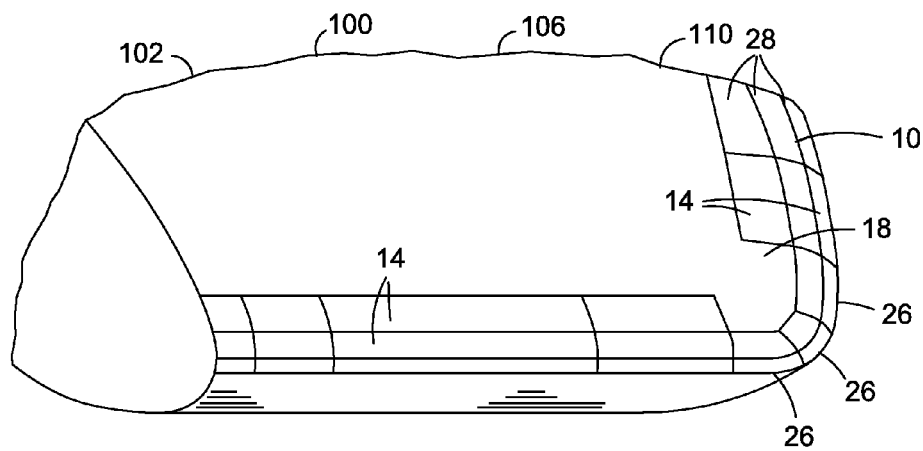
FIG. 5P is a perspective illustration of the wing tip and illustrating the termination of the columns in the corner of the wing tip as a result of the crossed face.
Figure 5Q:
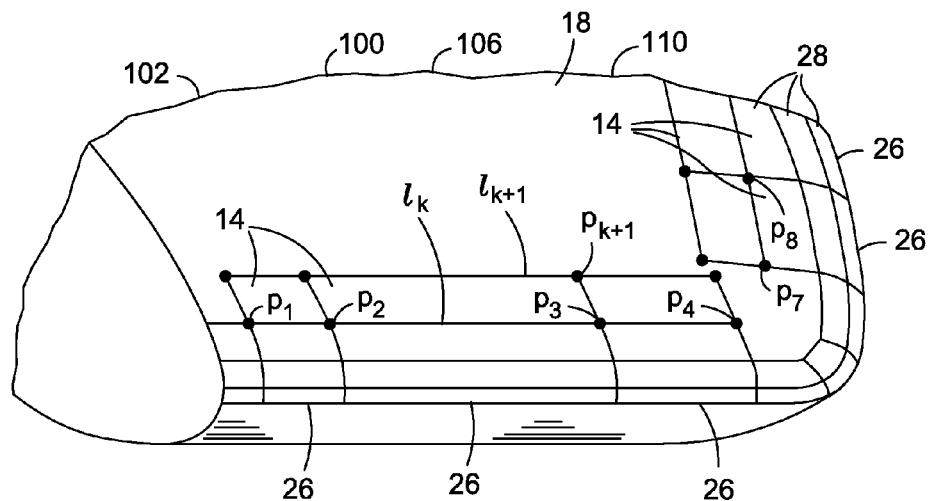
FIG. 5Q is a perspective illustration of the wing tip and illustrating the continuing growth of the remaining columns resulting in an additional layer of quadrilateral faces and further illustrating a reduction in the aspect ratio of quadrilateral faces in the additional layer.
Figure 5R:
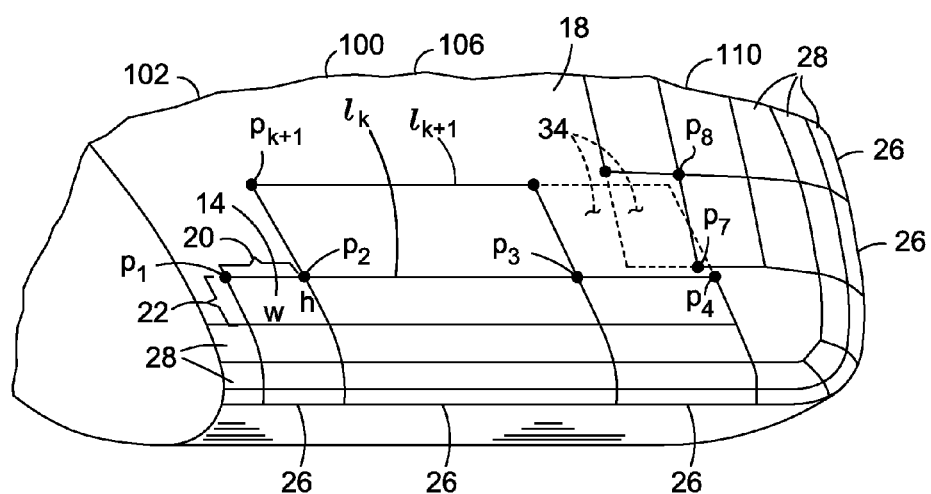
FIG. 5R is a perspective illustration of the wing tip and illustrating the collision of the face of one column with the face of a non-adjacent column resulting in overlapping faces.
Figure 5S:
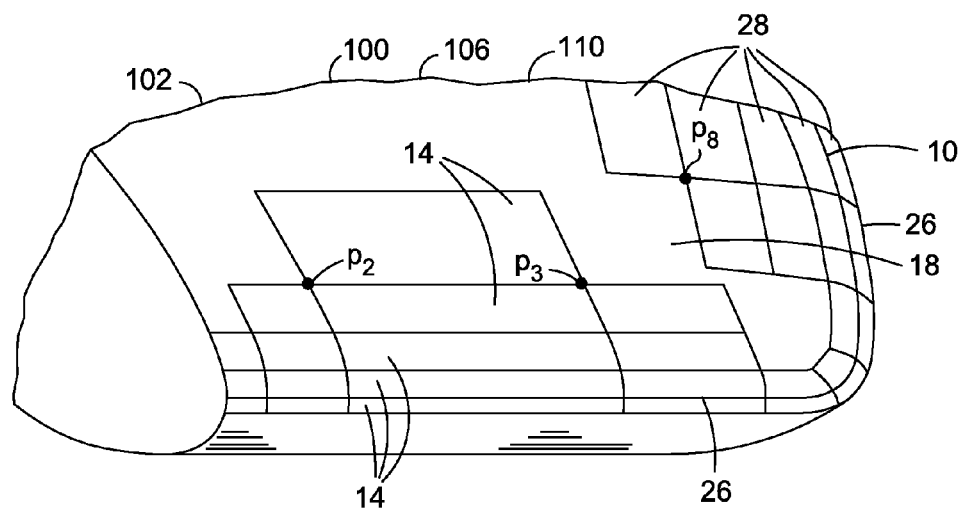
FIG. 5S is a perspective illustration of the wing tip and illustrating the termination of the columns having the overlapping faces.
Figure 5T:
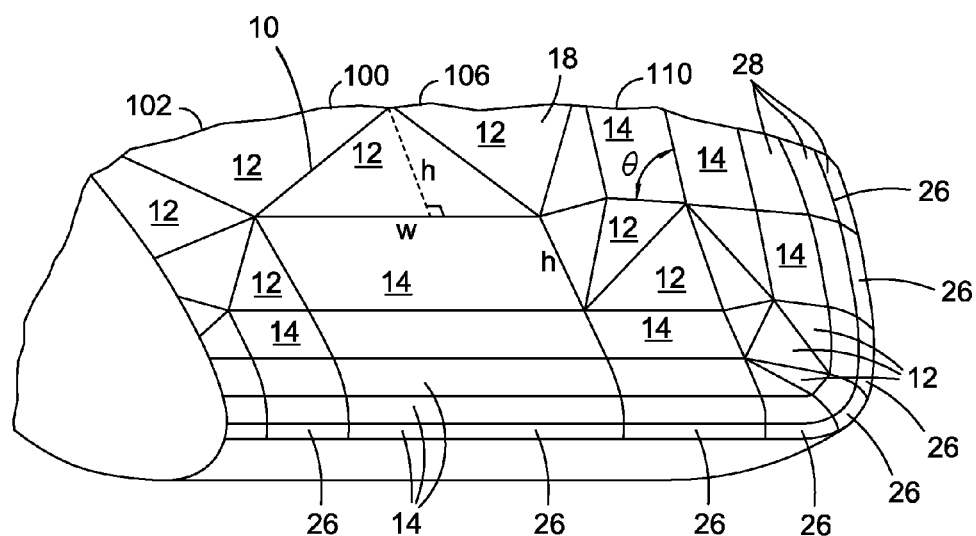
FIG. 5T is a perspective illustration of the wing tip and illustrating the advancement of a front of isotropic triangular faces from the terminated columns of quadrilateral faces such that the triangular faces cover the remaining portion of the surface of the wing tip.

Reference is now made to the flow chart of FIG. 4A-4B and the geometry of FIGS. 5A-5T which illustrate a sequence of grid generation steps performed on a wing tip 110 of an aircraft 102. Although a wing tip 110 is shown, the sequence of steps illustrated in FIGS. 5A-5T may be performed on any surface of any size, shape and configuration, without limitation. Furthermore, the grid generation methodology illustrated in FIGS. 5A-5T may be implemented on any vehicular or non-vehicular surface or surfaces, without limitation.

In FIG. 5A, step 200 of the methodology may comprise forming a layer curve $l_k$ along the surface 18 of the leading edge 108 of the wing tip 110. The layer curve $l_k$ may comprise an initial layer curve $l_0$ which may be formed along the leading edge 108 of the wing 106 or on any portion of a surface having relation high curvature in at least one direction. However, the layer curve $l_k$ may be formed at any location of any surface having any degree of curvature and is not necessarily limited to formation along a leading edge of a surface.

In FIG. 5A, step 202 may comprise forming a plurality of points $p_i$ along the initial layer curve $l_0$ in a distributed manner. The points $p_i$ may be distributed along the layer curve $l_k$ at a spanwise spacing $s_i$. The selection of the spanwise spacing $s_i$ may be dictated in part by the local radius of curvature of the surface. In addition, the selection of the spanwise spacing $s_i$ may be dictated or influenced by the fluid properties at localized areas of the surface. For the aircraft 102 wing 106 illustrated in FIG. 1-3, the fluid properties may be relatively constant along a spanwise direction i of the wing 106 limiting the need to locally alter the spanwise spacing $s_i$ (FIG. 5A) of the points $p_i$. However, the localized flow field or fluid properties at one location along the leading edge 108 of the wing 106 may differ relative to the flow field and/or fluid properties at another location along the leading edge 108 requiring variations in the spanwise spacing $s_i$ of points $p_i$.

For example, in FIGS. 2 and 3, the position of the engine nacelle 116 (FIG. 2) at a location forward of the wing 106 may affect the flow around the wing 106 portion downstream from the nacelle 116. Other phenomena may include shockwaves and/or vortices which may occur due to the location of the nacelle 116 and which may influence the flow field and fluid properties at the wing 106 leading edge 108. The effect on the flow may necessitate a relatively closer spanwise spacing $s_i$ (FIG. 5A) of the points $p_i$ at that location of the wing 106 relative to other locations along the span of the wing 106. The relatively closer spacing of the points $p_i$ results in higher grid resolution which may increase the accuracy of the CFD solution. Other locations along the span of the wing 106 may necessitate a relatively closer spanwise spacing $s_i$ of the points $p_i$. For example, the junction (i.e., not shown) of the wing with the fuselage may necessitate a relatively closer spanwise spacing $s_i$ of the points $p_i$ along the layer curve $l_k$ of the wing to accommodate localized effects in the flow that may occur at the wing/fuselage junction.

Likewise, the flow field or fluid properties at the wing tip 110 may require a relatively closer spanwise spacing $s_i$ of the points $p_i$ along the layer curve $l_k$ as illustrated in FIG. 5A in order to accommodate localized changes in the flow field at the wing tip 110 of the aircraft 102. For example, the wing tip 110 may generate tip vortices or other phenomena which may require a relatively closer spanwise spacing $s_i$ of the points $p_i$ to facilitate the generation of higher grid resolution at that location relative to the remaining portion of the wing 106. In this same manner, changes in the local curvature of the surface 18 of the leading edge 108 or other surface 18 portions may necessitate a change in the spanwise spacing $s_i$ of the points $p_i$ along the layer curve $l_k$. For example, a decrease in the local radius of curvature of the leading edge 108 may necessitate a corresponding decrease in the spanwise spacing $s_i$ of the points $p_i$ at the location of decreased radius of curvature. As can be seen in FIG. 5A, the spanwise spacing $s_i$ of the leading edge 108 may be reduced at the location of the wing tip 110 relative to the remaining portion of the leading edge 108. The reduction in spanwise spacing $s_i$ at the wing tip 110 may be necessitated in part by the reduced radius of curvature of the leading edge 108 at that location.

Referring now to FIG. 5B, step 204 of the methodology may include extending a tangent vector $n_i$ from each one of the points $p_i$ on the layer curve $l_k$. As can be seen in FIG. 5B, the points $p_i$ may be formed along the layer curve $l_k$ at the desired spacing as mentioned above. FIG. 5B illustrates points $p_1$ through $p_8$ formed along the initial layer curve $l_0$. Each one of the points $p_1$ through $p_8$ may include a tangent vector $n_i$ extending from the corresponding point. For example, FIG. 5B illustrates tangent vectors $n_1$ through $n_8$. The tangent vectors $n_1$ through $n_8$ may be extended from the corresponding points $p_1$ through $p_8$ along a direction that is substantially normal to the layer curve $l_k$ and tangent to the surface 18 at the location of the corresponding point $p_i$. In this regard, each one of the tangent vector $n_i$ lies on or is tangent to the geometry surface 18 and extends in a direction that is substantially normal to the layer curve $l_k$.

Referring to FIGS. 5C-5H, steps 206 to 216 will now be described to illustrate an embodiment of the grid generation methodology wherein a set of additional points may be formed on the surface 18. In the sequence of illustrations of FIGS. 5C-5H, the methodology may comprise forming an additional point $p_{k+1}$ (FIG. 5H) on the surface 18 at a step distance $\Delta_k$ (FIG. 5H) from the corresponding one of the most recently formed points $p_i$ (FIG. 5H). The additional point $p_{k+1}$ may be formed by initially advancing each one of the most recently formed points $p_i$ along the corresponding tangent vector $n_i$ (FIG. 5C) in step 206.

For example, FIG. 5C illustrates an enlarged view of the leading edge 108 of the wing 106 and illustrating one of the initial points $p_i$ formed along the initial layer curve $l_0$ and having a tangent vector $n_i$ extending in a substantially normal direction from the initial layer curve $l_0$. FIG. 5C further illustrates an advanced point $p_{adv}$ located on the tangent vector $n_i$ at the step distance $\Delta_k$ from the point $p_i$ as shown in FIG. 5C.

In FIG. 5D, step 208 may comprise projecting the advanced point $p_{adv}$ from the tangent vector $n_i$ to the surface 18 to form the additional point $p_{k+1}$. As can be seen, the advanced point $p_{adv}$ is projected along a direction that is substantially normal to the surface 18. The dashed arc in FIG. 5D illustrates the curvature of the surface 18 between the point $p_i$ (i.e., the most recently formed point) and the additional point $p_{k+1}$.

In FIG. 5E, the distance between the most recently formed point $p_i$ and the additional point $p_{k+1}$ may be measured and defined as distance $\Delta_p$. The distance $\Delta_p$ may be compared to the step distance $\Delta_k$ (FIG. 5C). If the distance $\Delta_p$ and step distance $\Delta_k$ are unequal or if the difference falls outside of a predetermined tolerance band, step 210 illustrated in FIG. 5F may comprise extending a temporary vector $n_{temp}$ between the additional point $p_{k+1}$ and the initial point $p_i$ (i.e., the most recently formed point $p_i$).

Referring to FIG. 5G, step 212 may comprise adjusting the position of the additional point $p_{k+1}$ along the temporary vector $n_{temp}$ to a location that is predicted to result in the projection thereof onto the surface 18 at a location that is substantially equivalent to the step distance $\Delta_k$ (FIG. 5C). For example, FIG. 5G illustrates the position of the additional point $p_{k+1}$ being adjusted to a location along the temporary vector $n_{temp}$ that is further from the initial point $p_i$ than the first-projected location of the additional point $p_{k+1}$ onto the surface 18 shown in FIG. 5D. The adjusted position of the additional point $p_{k+1}$ is additionally shown in FIG. 5G as being projected onto the surface 18 in step 214.

In FIG. 5H, the projected location of the additional point $p_{k+1}$ may then be compared to the most recently formed point $p_i$ in order to determine whether the distance $\Delta_p$ is substantially equivalent to the step distance $\Delta_k$. If such distances are unequal or fall outside of a predetermined tolerance, steps 210 through 214 may be iteratively repeated as described above until the distance between the additional point $p_{k+1}$ and the most recently formed point $p_i$ are substantially equivalent to the step distance $\Delta_k$. The process described in steps 206 through 214 may be applied to all the points $p_i$ formed along the initial layer curve $l_0$ (FIG. 5C) as well as to points $p_i$ to be formed along the subsequent layer curves $l_k$ (FIG. 5J).

Referring still to FIG. 5H, the step distance $\Delta_k$ may be defined in several ways. For example, the step distance $\Delta_k$ may be defined as a predetermined step size which may be explicitly specified by a user for each one of the layers 28. As illustrated in FIG. 5K, a layer 28 comprises a series of faces 14 which are formed along the spanwise direction i and which are bounded by adjacent pairs of layer curves $l_k$ and $l_{k+1}$. The predetermined step size may comprise a measure of the distance between the layer curves $l_k$ and $l_{k+1}$. In the same regard, the predetermined step size may be defined as the distance between each one of the most recently formed points $p_i$ and the corresponding ones of the additional points $p_{k+1}$. As described in greater detail below and illustrated in FIG. 5J, the additional points $p_{k+1}$ may be interconnected to one another by width elements 20 that are joined end-to-end to form the subsequent layer curves $l_{k+1}$. The predetermined step size may be selected to provide a desired aspect ratio between the layer curves $l_k$ and $l_{k+1}$. In this manner, the predetermined step size defines the aspect ratio of the faces 14 that make up each one of the layers 28.

More specifically and referring briefly to FIG. 5J, each layer 28 is made up of the series of faces 14. Each one of the faces 14 is bounded on four sides by width elements 20 and height elements 22. Advantageously, the grid generation methodology disclosed herein facilitates the tailoring of the aspect ratio of the quadrilateral faces 14 to the geometry of the surface 18 and to the fluid properties or other flow constraints. In an embodiment, the predetermined step size between the most recently formed points $p_i$ (i.e., which define the layer curve $l_k$) and the corresponding ones of the additional points $p_{k+1}$ (i.e., which define the layer curve $l_{k+1}$) may be such that the quadrilateral faces 14 have an aspect ratio of at least 20. However, the predetermined step size may be selected to provide an aspect ratio of any value and is not limited to a specific aspect ratio.

Referring back to FIG. 5H, the predetermined step size may alternatively be defined as an initial step size $\Delta_0$ and a growth rate that may be applied between the subsequent layer curves $l_k$ (FIG. 5J). For example, the initial step size $\Delta_0$ between the initial layer curve $l_0$ and the subsequent layer curve $l_{k+1}$ may be selected such that the quadrilateral faces 14 (FIG. 5J) have a desired aspect ratio. For the next layer 28 (FIG. 5J) to be formed, the growth rate may be selected such that the aspect ratio of the faces 14 increases with increasing radius of curvature of the surface. However, a variety of other factors may affect the selection of the growth rate between successive layers 28. For example, the step distance $\Delta_k$ (FIG. 5H) may be selected in consideration of flow field constraints. The selection of the step distance $\Delta_k$ may also be based upon the occurrence of local phenomena such as shockwaves and/or vortices at a given location.

Referring to FIG. 5K, in an embodiment, the growth rate between the layers 28 may comprise a geometric growth rate of approximately 1.1 to 1.8 times the step distance $\Delta_k$ of the most recently formed layer 28. However, the growth rate may be defined as any value including a growth rate of less than 1.0. The growth rate may also be defined as a combination of growth rates that may vary from less than 1.0 to greater to 1.0 as the grid 10 front advances along the surface 18. Additionally, the growth rate may be defined as a function of the surface geometry, the flow conditions, the environment or any other suitable parameter or combination of parameters. In this regard, the growth rate may be defined as an exponential growth rate, a linear growth rate and/or a user-specified growth rate.

In an embodiment, the growth rate may be selected to be proportional to the average radius of curvature of the surface 18 in the location between the additional point $p_{k+1}$ and the most recently formed points $p_i$ as shown in FIG. 5K. An increasing radius of curvature of the surface 18 may result in an increasing aspect ratio of the faces 14. The increasing aspect ratio may minimize the overall size (i.e., quantity of elements) of the entire grid 10 (FIG. 5T) formed on the surface 18 which may reduce computational intensity.

Referring to FIG. 5I, the additional points $p_{k+1}$ may be formed on the surface 18 in an alternative manner by advancing the initial points $p_i$ by an amount equal to the step distance $\Delta_k$ along the tangent vector $n_i$ in step 206 as shown in FIG. 5C and then projecting the advanced point $p_{adv}$ onto the surface 18 in step 208 as illustrated in FIG. 5D to form the additional point $p_{k+1}$ without the further iterative repetition of steps 210 to 214 to adjust and re-project the additional point $p_{k+1}$. Forming the additional points $p_{k+1}$ (FIG. 5I) without adjusting the location thereof along a temporary vector $t_{emp}$ (FIG. 5G) may increase the speed with which the grid 10 (FIG. 5T) is generated. However, the accuracy of the grid 10 may be reduced. The reduced accuracy of the grid 10 generated in such a manner may be acceptable for certain types of analyses such as for analysis of the electromagnetic response.

Referring to FIG. 5J, step 218 of the methodology may comprise interconnecting the set of newly created additional points $p_{k+1}$ to form an additional layer curve $l_{k+1}$. The additional layer curve $l_{k+1}$ and most recently formed curve $l_k$ collectively define one of the layers 28 as illustrated in FIG. 5J. The growth of the grid 10 is a result of the stacking of additional layers 28 in the chordwise direction k as illustrated in FIG. 5J. The interconnection of the set of additional points $p_{k+1}$ with corresponding ones of the most recently formed points $p_i$ in FIG. 5J forms the layer 28 comprised of the series of quadrilateral faces 14. In this regard, each layer 28 is comprised of a series of quadrilateral faces 14 in the spanwise direction i wherein the faces 14 are separated by height elements 22. A stack of one or more of the quadrilateral faces 14 comprises one of the columns 26. Any one of the columns 26 may be terminated during the layer-by-layer growth of the grid 10 upon the occurrence of a terminating condition in step 222 as described below.

Referring to FIG. 5K, step 224 of the methodology comprises iteratively repeating steps 204 through 222 until each one of the columns 26 is terminated. FIG. 5K illustrates the initial process in the formation of a third one of the layer curves $l_k$ (FIG. 5M) formed by performing step 204 wherein the tangent vectors $n_i$ (FIG. 5K) may be extended from each one of the most recently formed points $p_i$. As was earlier indicated, the tangent vectors $n_i$ may be extended along a direction that is substantially normal to the most recently formed layer curve $l_k$ and tangent to the surface 18 at the point $p_i$ from which the tangent vector $n_i$ extends.

FIG. 5K further illustrates the advancing of the most recently formed points $p_i$ by an amount equivalent to the step distance $\Delta_k$ along the corresponding tangent vector $n_i$ in order to form the set of advanced points $p_{adv}$ along the tangent vectors $n_i$ in step 206. Steps 208 through step 214 illustrated in FIGS. 5D through 5H are repeated in an iterative manner until the distance between the additional point $p_{k+1}$ and the most recently formed points $p_i$ is substantially equivalent to the step distance $\Delta_k$.

Referring to FIG. 5L, shown is the formation of the additional set of points $p_{k+1}$ at the step distance $\Delta_k$ from the most recently formed points $p_i$ in step 206. In FIG. 5M, the set of additional points $p_{k+1}$ may be interconnected in step 218 in order to form an additional one of the layer curves $l_{k+1}$. As can be seen in FIG. 5M, the formation of the additional one of the layer curves $l_k$ on the wing tip 110 results in the addition of a quadrilateral face 14 to each one of the columns 26 as the grid 10 advances. The additional points $p_{k+1}$ are connected with corresponding ones of the most recently formed points $p_i$ in step 220 in order to form an additional layer 28 of the quadrilateral faces 14.

In FIG. 5N, the process of forming a third set of additional points $p_{k+1}$ on the surface 18 is performed by repeating steps 206 through 216 as described above. In this regard, FIG. 5N illustrates the extension of the tangent vectors $n_1$ through $n_8$ from each one of the most recently formed points $p_i$. It can be seen that tangent vectors $n_5$ and $n_6$ cross one another resulting in crossing tangent vectors 30. The resulting crossing tangent vectors 30 represent a collision of the face 14 of one of the columns 26 with the face 14 of an adjacent one of the columns 26 creating a crossed face 32. Referring to FIG. 5O, the crossed face 32 occurs between the quadrilateral faces 14 of two of the columns 26. In this regard, FIG. 5O represents a terminating condition occurring due to the collision of the face 14 of one column 26 with the face 14 of another column 26. Referring to FIG. 5P, shown is the grid 10 configuration after the termination of the three columns 26 associated with the crossed face 32.

Referring to FIG. 5Q, continuing on with the grid generation methodology, a set of additional points $p_{k+1}$ are formed on the surface 18 in a manner as was described above. In FIG. 5R, the quadrilateral face 14 bounded by points $p_1$ and $p_2$ may be terminated due to the face 14 reaching an aspect ratio of a predetermined value. As was earlier indicated, the aspect ratio of a face 14 may be defined as the ratio of the width w of the face 14 to the height h of the face 14. In FIG. 5Q, the face 14 between points $p_1$ and $p_2$ has an aspect ratio wherein the width w of the face 14 is substantially equivalent to the height h and satisfying one of the terminating conditions wherein the aspect ratio of the face 14 reaches a predetermined value such as unity.

Referring to FIG. 5R, shown is the formation of an additional one of the layers 28 resulting in the creation of colliding faces 14. For example, the face 14 in the column 26 bounded by points $p_3$ and $p_4$ is shown as colliding with the face 14 in the column 26 bounded by points $p_7$ and $p_8$. The collision of the faces 14 creates overlapping faces 34 (shown in dashed) satisfying one of the terminating conditions of step 222 and halting the growth of the affected columns 26.

Referring to FIG. 5S, the face 14 in the column 26 bounded by points $p_2$ and $p_3$ and the face 14 in the column 26 bounded by points $p_8$ and $p_9$ ($p_9$ not shown) may also be terminated due to each one of the columns 26 reaching a predetermined quantity of faces 14 and satisfying one of the terminating conditions in step 222. For example, in the example shown in FIG. 5S, the predetermined quantity of faces 14 may be set at a value of 5 such that the columns 26 bounded by points $p_2$ and $p_3$ and by points $p_8$ and $p_9$ are terminated. However, it should be noted that the above-described terminating conditions are not to be construed as limiting additional or alternative terminating conditions that may be imposed during step 222. For example, the terminating condition may comprise a requirement that a column 26 is terminated if the face 14 in the column 26 has at least one interior corner 24 having an interior angle θ (FIG. 5T) that is less than a predetermined angle. For example, a column may be terminated if the interior angle θ between a width element 20 (FIG. 5J) and a height element 22 (FIG. 5J) of one of the faces 14 in the column 26 is less than 45 degrees although the predetermined angle may be set at any angular value. As can be seen in FIG. 5T, each column 26 of the advancing grid 10 may terminate at a different quantity of layers 28.

Referring to FIG. 5T, step 226 of the methodology may comprise the extending of triangular faces 12 from the terminated columns 26 using a suitable triangulation gridding technique in order to cover at least a portion of the surface 18 not covered by the quadrilateral faces 14. In an embodiment, the triangular faces 12 may be substantially isotropic to provide a uniform transition with the quadrilateral faces 14 that have been terminated under the above-mentioned terminating conditions. The triangular faces 12 may be generated using any suitable meshing algorithm including, but not limited to, Delaunay triangulation and advancing front triangulation. By including a triangulation gridding technique with the grid generation methodology disclosed herein, the entirety of the surface of an object 100 may be autonomously provided with a grid 10.

Advantageously, as shown in FIG. 5T, the grid 10 may be comprised of high aspect ratio quadrilateral faces 14 along directions of relatively high curvature in the surface 18. Furthermore, the width elements 20 (FIG. 5J) and height elements 22 (FIG. 5J) that form the faces 14 of the grid 10 may also be substantially aligned with the direction of curvature of the surface 18. The quadrilateral faces 14 preferably transition in a relatively uniformly manner from high aspect ratio quadrilateral faces 14 such as near the leading edge 108 of a surface 18 to substantially isotropic or near-isotropic quadrilateral faces 14 at the termination of each one of the columns 26. The terminated columns 26 of quadrilateral faces 14 provide a location for the formation of an advancing front of substantially isotropic triangular faces 12 which may be generated using any suitable triangular meshing algorithm.

It should be noted that the above-described steps of the methodology or any combination of the steps, in whole or in part, may be implemented in a computer generated process comprising a computer program product which may include at least one computer readable storage medium. The computable readable instructions may be loaded onto a computer or other appropriate programmable apparatus, device or system in order to implement the above-described steps. In this manner, a computer implemented methodology as described above, may be produced such that the computable readable instructions may be executed on a processor-based system to provide steps for implementing the methodology.

The methodology may be implemented by hardware, firmware, and/or software or any combination thereof. The computer readable storage medium may include a non-volatile storage medium and/or software which may include computable readable code or portions thereof which may be embodied in the computable readable storage medium. The computer readable storage medium may have computable readable instructions for generating a grid 10 (FIG. 3) on a surface 18 (FIG. 3) wherein the grid 10 is generated in a layer-by-layer arrangement and being formed such that the grid 10 transitions in a relatively uniform manner from anisotropic (i.e., relatively high aspect ratio) quadrilateral faces 14 (FIG. 3) to substantially isotropic quadrilateral faces 14 downstream of a leading edge 108 ((FIG. 3).

Additional modifications and improvements of the present disclosure may be apparent to those of ordinary skill in the art. Thus the particular combination of parts described and illustrated herein is intended to represent only certain embodiments of the present disclosure and is not intended to serve as limitations of alternative embodiments or devices within the spirit and scope of the disclosure.

What is claimed is:

1. A method of generating a grid on a surface, comprising the steps of:
    (a) forming a single layer curve along the surface;
    (b) forming a plurality of points along the layer curve;
    (c) extending, using a processor, a tangent vector $n_i$ from the most recently formed points $p_i$ on a most recently formed layer curve $l_k$ in a manner such that the tangent vector $n_i$ is normal to the most recently formed layer curve $l_k$ and tangent to the surface;
    (d) forming a set of additional points on the surface at a step distance from a corresponding one of the most recently formed points $p_i$ of the most recently formed layer curve $l_k$;
    (e) interconnecting the set of additional points to form an additional layer curve;
    (f) connecting the set of additional points of the additional layer curve with the corresponding most recently formed point $p_i$ of the most recently formed layer curve $l_k$ to form a layer of quadrilateral faces, each one of the faces comprising a column;
    (g) terminating the growth of a column upon an aspect ratio of the face in the column exceeding a predetermined value; and
    (h) repeating steps (c) through (g) until the columns are terminated.

2. The method of claim 1 wherein step (d) of forming a set of additional points on the surface comprises the following steps:
    (i) advancing each one of the most recently formed points $p_i$ by an amount equal to the step distance along the corresponding tangent vector $n_i$ to form an advanced point on the tangent vector $n_i$;
    (ii) projecting the advanced point onto the surface to form the additional point;
    (iii) extending a temporary vector between the additional point and the most recently formed point $p_i$ if the distance therebetween is unequal to the step distance;
    (iv) adjusting the position of the additional point along the temporary vector;
    (v) projecting the additional point onto the surface; and
    (vi) repeating steps (iii) through (v) until the distance between the additional point and the most recently formed point $p_i$ is equivalent to the step distance.

3. The method of claim 1 wherein step (h) of terminating the growth of the column when the face aspect ratio exceeds a predetermined value comprises:
    the face aspect ratio reaches unity.

4. The method of claim 1 wherein step (h) of terminating the growth of the column when the face aspect ratio exceeds a predetermined value further includes at least one of the following:
    the face of the column collides with the face of an adjacent one of the columns creating a crossed face;
    the face of the column collides with the face of a non-adjacent one of the columns creating overlapping faces;
    the column grows to a predetermined quantity of faces;
    the face has at least one interior corner defining an interior angle of less than approximately 45 degrees.

5. The method of claim 1 wherein the step distance comprises at least one of the following:
    a predetermined step size between each one of the most recently formed points $p_i$ and the corresponding ones of the additional points;
    an initial step size and a growth rate.

6. The method of claim 5 wherein the initial step size is such that the quadrilateral faces bounded by the layer curve have an aspect ratio of at least 20.

7. The method of claim 5 wherein the growth rate is approximately 1.1 to 1.8 times the most recent step size.

8. The method of claim 5 wherein the growth rate is proportional to an average radius of curvature of the surface in an area between the additional point and the most recently formed point $p_i$.

9. The method of claim 1 wherein the points are distributed along the layer curve based upon a curvature of the surface.

10. The method of claim 1 further comprising the step of:
    extending triangular faces from the terminated columns.

11. The method of claim 10 wherein the triangular faces are isotropic.

12. The method of claim 10 wherein the triangular faces are generated by at least one of Delaunay triangulation and advancing front triangulation.

13. A method of generating an advancing front of quadrilateral faces on a surface having a leading edge, comprising the steps of:
    (a) forming a single layer curve along the leading edge;
    (b) forming a plurality of points in a distributed manner along the layer curve;
    (c) extending, using a processor, a tangent vector $n_i$ from the most recently formed points $p_i$ on a most recently formed layer curve $l_k$ in a manner such that the tangent vector $n_i$ is normal to the most recently formed layer curve $l_k$ and tangent to the surface;
    (d) forming a set of additional points on the surface at a step distance from corresponding ones of the most recently formed points $p_i$ of the most recently formed layer curve $l_k$;
    (e) interconnecting the set of additional points to form an additional layer curve;
    (f) connecting the set of additional points of the additional layer curve with the corresponding most recently formed point $p_i$ of the most recently formed layer curve $l_k$ to form a layer of quadrilateral faces, the quadrilateral faces comprising a series of columns each including at least one quadrilateral face;

(g) terminating the growth of a column upon an aspect ratio of the face in the column reaching unity;

(h) repeating steps (c) through (g) until the columns are terminated; and (i) extending triangular faces from the terminated columns.

14. The method of claim 13 wherein step (d) of forming a set of additional points on the surface comprises the following steps:

(i) advancing each one of the most recently formed points $p_i$ by an amount equal to the step distance along the corresponding tangent vector $n_i$ to form an advanced point on the tangent vector $n_i$;

(ii) projecting the advanced point onto the surface to form the additional point;

(iii) extending a temporary vector between the additional point and the most recently formed point $p_i$ if the distance therebetween is unequal to the step distance;

(iv) adjusting the position of the additional point along the temporary vector;

(v) projecting the additional point onto the surface; and (vi) repeating steps (iii) through (v) until the distance between the additional point and the most recently formed point $p_i$ is equivalent to the step distance.

15. The method of claim 13 wherein the step distance comprises at least one of the following:

a predetermined step size between each one of the most recently formed points $p_i$ and the corresponding ones of the additional points;

an initial step size and a growth rate.

16. The method of claim 15 wherein the growth rate is proportional to an average radius of curvature of the surface in an area between the additional point and the most recently formed point $p_i$.

17. The method of claim 13 wherein the points are distributed along the layer curve based upon a curvature of the surface.

18. The method of claim 13 further comprising the step of: advancing a front of triangular faces from the terminated columns.

19. A computer program product comprising at least one non-transitory computer-readable storage medium having computer-readable program instructions stored therein that, when executed by a processor, enable a processor-based system to generate a grid of quadrilateral faces on a surface, the computer-readable program instructions comprising the steps of:

(a) forming a single layer curve along the surface;

(b) forming a plurality of points along the layer curve;

(c) extending, using a processor, a tangent vector $n_i$ from the most recently formed points $p_i$ on a most recently formed layer curve $l_k$ in a manner such that the tangent vector $n_i$ is normal to the most recently formed layer curve $l_k$ and tangent to the surface;

(d) forming a set of additional points on the surface at a step distance from a corresponding one of the most recently formed points $p_i$ of the most recently formed layer curve $l_k$;

(e) interconnecting the set of additional points to form an additional layer curve;

(f) connecting the set of additional points of the additional layer curve with the corresponding most recently formed point $p_i$ of the most recently formed layer curve $l_k$ to form a layer of quadrilateral faces, each one of the faces comprising a column;

(g) terminating the growth of a column upon an aspect ratio of the face in the column exceeding a predetermined value; and (h) repeating steps (c) through (g) until the columns are terminated.

20. The computer program product of claim 19 wherein step (d) of forming a set of additional points on the surface comprises the following steps:

(i) advancing each one of the most recently formed points $p_i$ by an amount equal to the step distance along the corresponding tangent vector $n_i$ to form an advanced point on the tangent vector $n_i$;

(ii) projecting the advanced point onto the surface to form the additional point;

(iii) extending a temporary vector between the additional point and the most recently formed point $p_i$ if the distance therebetween is unequal to the step distance;

(iv) adjusting the position of the additional point along the temporary vector;

(v) projecting the additional point onto the surface; and (vi) repeating steps (iii) through (v) until the distance between the additional point and the most recently formed point $p_i$ is equivalent to the step distance.

21. The computer program product of claim 19 wherein step (h) of terminating the growth of the column when the face aspect ratio exceeds a predetermined value comprises:

the face aspect ratio reaches unity.

22. The computer program product of claim 19 wherein step (h) of terminating the growth of the column when the face aspect ratio exceeds a predetermined value further includes at least one of the following:

the face of the column collides with the face of an adjacent one of the columns creating a crossed face;

the face of the column collides with the face of a non-adjacent one of the columns creating overlapping faces;

the column grows to a predetermined quantity of faces;

the face has at least one interior corner defining an interior angle of less than approximately 45 degrees.

23. The computer program product of claim 22 wherein the points are distributed along the layer curve based upon a curvature of the surface.

24. The computer program product of claim 22 further comprising the step of:

advancing a front of triangular faces from the terminated columns.

25. The computer program product of claim 19 wherein the step distance comprises at least one of the following:

a predetermined step size between each one of the most recently formed points and the corresponding ones of the additional points;

an initial step size and a growth rate.

* * * * *